April 18, 1967 F. G. SPANUR 3,314,824
PUNCTURE-TYPE SAFETY SEAL FOR GALVANIC CELLS
Filed March 22, 1965
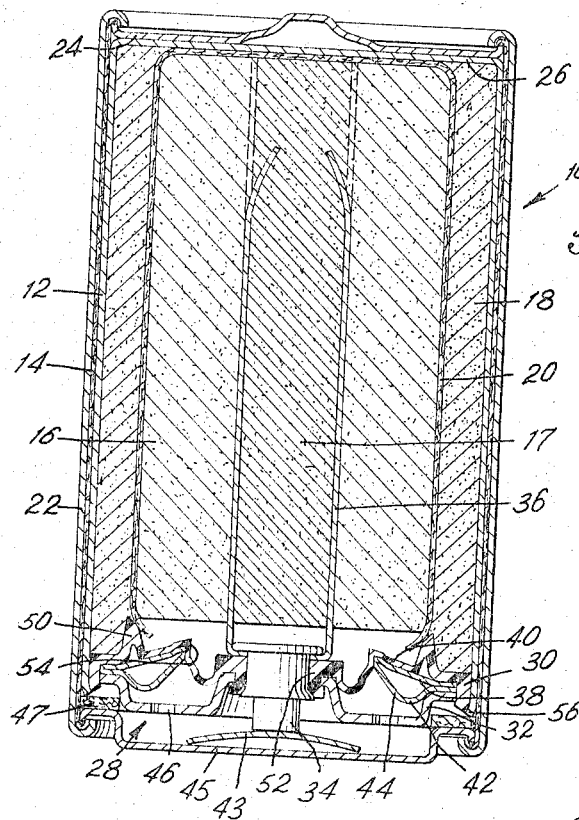
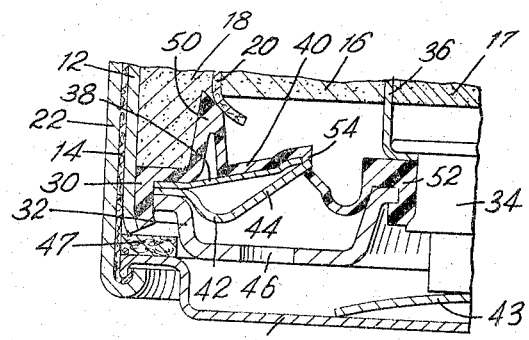
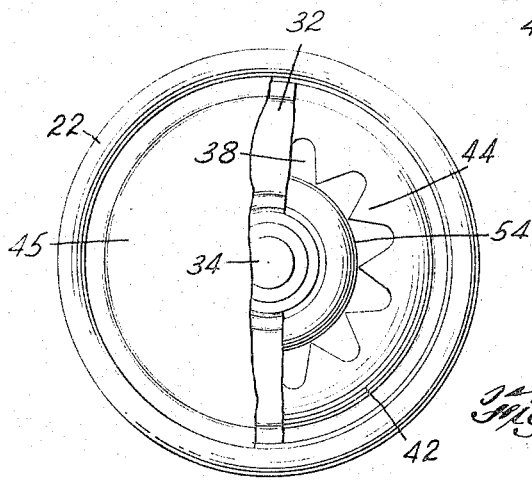
INVENTOR
FRANK G. SPANUR
BY Henry A. Marzullo Jr.
ATTORNEY

3,314,824
PUNCTURE-TYPE SAFETY SEAL FOR GALVANIC CELLS

Frank G. Spanur, Parma Heights, Ohio, assignor to Union Carbide Corporation, a corporation of New York
Filed Mar. 22, 1965, Ser. No. 441,648
6 Claims. (Cl. 136—178)

This invention relates to puncture-type safety seals for galvanic cells or batteries of the sealed type, and has as its principal object to provide an improved radially sealed, puncture-type seal assembly for alkaline-manganese dioxide cells and the like.

Generally stated, the above and other objects and advantages of the invention are accomplished by the combination in a galvanic cell embodying a radial seal assembly of a spring washer positioned within the seal assembly and a radially acting toothed puncture washer, the teeth of which slide relative to the spring washer when the spring washer is subjected to pressure.

The invention will readily become apparent and be better understood by particular reference to the following detailed description when considered in connection with the accompanying drawing wherein:

FIG. 1 is a vertical sectional view of an alkaline manganese dioxide-zinc cell embodying the improved puncture-type safety seal of the invention;

FIG. 2 is an enlarged bottom view of the cell, parts being broken away to show the details of the safety seal illustrated in FIGURE 1; and FIG. 3 is an enlarged fragmentary view in section, showing the safety seal of the invention after the seal has been punctured.

Referring now to the drawing, wherein like reference characters designate like or corresponding parts, and particularly to FIGS. 1 and 3, there is shown an alkaline manganese dioxide zinc cell 10 which is sealed with the improved puncture-type safety seal of the invention. The cell 10 comprises a cupped metal container 12 (shown upside down) provided with a tubular-shaped insulating jacket 14 and having therein a gelled anode 16, a gelled electrolyte 17, and a cathode 18 separated from the anode 16 by a separator 20. An outer wrapper 22 suitably of metal surrounds the container 12 and insulator 14. At the upper end of the cell 10 is provided a conventional cover 24 which contacts the cupped container 12 and serves as the positive terminal of the cell.

As shown in FIG. 1, the cupped metal container 12 is sealed at its bottom open end with the puncture-type seal of the invention. As shown, the seal comprises a generally annular-shaped seal gasket 30, an unpolarized metallic cover 32 which resides in said seal gasket 30 and which has a vent 46 and a negatively polarized centrally located rivet terminal element 34 which is in contact with an anode current collector 36. A metallic dished shaped washer 38 is disposed within the seal gasket 30 and is in contact with the tapered bottom portion 40 of the seal gasket 30. A metallic toothed washer 42 having teeth 44 directed radially inward is disposed contiguous to the dished shaped washer 38 such that the teeth 44 can slide relative to the sloping surface of the dished shaped washer 38 as it is displaced by gas pressure generated within the cell 10.

Within the bottom of the cell and just below the seal assembly of the invention is a negative terminal cover 45. It is generally desirable to employ a contact spring 43 between the negative terminal 34 and the negative terminal cover 45. An insulating washer 47 is also positioned between the unpolarized cover 32 and the external negative terminal cover 45 so as to insulate it from the cupped container 12 and the negative terminal cover 45. This "false" external cover 45 is desirable since it will retain any liquid or spew which may escape in the event the seal vents. The seal gasket 30 is suitably compressed radially between the negative rivet terminal 34 and the cover 32 and between the cover 32 and the container 12 thereby resulting in a leak resistant, gas tight cell.

The seal gasket 30, as best shown in FIG. 1, is a one piece suitably molded or machined element having a skirt 50 which encircles and aids in holding the free ends of the cell separator 20 in place, a centralized inner flange 52 which provides sufficient support for the rivet 34, and a thin vertical wall 54 surrounding the flange 52 to facilitate the ready penetration of the teeth of the toothed washer 42. The preferred material for the seal gasket 30 is a hard, dielectric plastic-like material or a plastic, such as nylon, a polymer of hexamethylene diammonium adipate. One such nylon plastic found to be extremely satisfactory in the practice of the invention is sold under the trademark "Zytel." This material exhibits high compressive and shear strength and is capable of withstanding large stresses without a tendency to cold flow. Other suitable plastic materials may also be employed in the practice of the invention provided they are also characterized by a resistance to cold-flow and high compressive and shear strength.

Referring now to FIGS. 2 and 3, as gas is generated within the cell the seal gasket 30 is deflected longitudinally outwardly in the unrestrained central portion to a degree wherein it causes the displacement of the dished-shaped washer 38. As the dished-shaped washer deflects elastically in proportion to the "displacement" load, the teeth 44 of the toothed washer 42 bear and slide along the inclined surface of the dished-shaped washer 38 and eventually move radially inward to puncture in at least one place the thin vertical wall 54 of the seal gasket 30, thereby venting the generated gas. This gas pressure relief action is more positive and predictable than with heretofore seals conventionally employed in the art.

It should be noticed that the toothed washer 44 and dished-shaped washer 38 are protected from contact with the corrosive reagents within the cell by the seal gasket 30 which is interposed therebetween and sealed between the cover 32 and the container 12 and between the negative rivet terminal 34 and the cover 32. The negative terminal rivet 34 should also be noted to provide structural support and electrical contact for the anode collector strip 36, whereas the "crimped" or curled edge 56 of the cupped metal container 12 holds the dished-shaped washer 38 and toothed washer 44 tightly together in mutual cooperative association with the radial seal at their outer peripheral edges.

In accordance with the above construction, it should be noted that an important virtue or feature of the invention is that it overcomes one of the limitations of prior art galvanic cells embodying a seal of the "safety type" wherein a safety blow-out, gas permeable membrane with no back-up washer is utilized. Such prior art cells have shown repeated susceptibility to leakage at pressures substantially lower than the cell blow-out pressure due to stress cracking of the seal gasket generally in the vicinity of the safety blow out membrane. In this connection, it is noted that the safety seal of the invention is reliable and more predictable in that no leakage has been observed prior to the penetrations of at least one tooth of the toothed washer. Of course, once the seal gasket is punctured the cell not only leaks but because it then functions as an open or unsealed cell, it will "dry up" in about a week and perhaps sooner if current continues to be taken from the cell. Obviously, as in prior art designs there may be some minute diffusion of hydrogen gas past the seal or through the seal gasket of the safety seal of the present invention.

In testing the effectiveness of the invention, a number of "D" size cells were sealed with the puncture-type safety seal of the invention. Another series of cells (identified as the control cells) embodied a conventional safety blow-out, gas permeable membrane (no back-up washer). Both types of cells are designed to vent at approximately the same pressure under normal operating conditions. All of the cells tested were alkaline cells and were essentially identical except for the difference in the seals. The following table illustrates the improved leak resistance of the safety seal of the invention over the control cells.

TABLE I

|  | Days to Leakage at 45° C. | | | Days to Leakage at 54° C. | | |
| --- | --- | --- | --- | --- | --- | --- |
|  | First Incidence | 20% Leakers | 50% Leakers | First Incidence | 20% Leakers | 50% Leakers |
| Control | 69 | 90 | 97 | 34 | 36 | 47 |
| New Seal | Over 170 |  |  | 71 | 99 | 148 |

Since the cells tested had no "false" end covers or outer jackets, leakage could immediately be detected upon penetrating the seal gasket. In the above table, it is noted that it took about two and one-half times longer at 45° C. to detect any cell leakage from cells embodying the safety seal of the invention versus the control cells. Furthermore, the safety seals never approached the 20%–50% leakage level whereas the control cells experienced 20% leakage at 90 days and 50% leakage at 97 days. At the higher temperature, leakage with the safety seal of the invention results from the normal operation of the puncturing device. The spread in days for various percent cells leaking is the natural result of different gassing rates for individual cells and the normal variation in release pressure between individual seals. Earlier incidence of leakage and higher percent leakers throughout the test on the control cells reflects the gasket cracking problem of the prior art construction.

While the invention has been described in connection with a specific embodiment thereof, it will be understood that it is capable of further modifications, and this application is intended to cover any variations, uses, or modifications of the invention following, in general, the principles of the invention and including such departures from the present disclosure as come within known or customary practice in the art to which the invention pertains and as may be applied to the essential features hereinabove set forth, and as fall within the spirit and scope of the invention or the limits of the appended claims.

What is claimed is:

1. A sealed galvanic cell having a centralized terminal and a cover having a vent comprising, in combination, a cupped metallic container subject to internal gas pressure and a safety seal comprising an annular-shaped seal gasket of plastic material sealing the open end of said cupped container between said centralized terminal and said cover of said cell and between said cover and said cupped container, said seal gasket having an inner flange for supporting said centralized terminal, an outer flange portion and a thin vertical wall portion surrounding said inner flange, a yieldable annular-shaped metallic back-up washer having an inwardly inclined surface disposed below and in juxtaposition with said seal gasket leaving exposed said thin vertical wall portion of said seal gasket, a bowed annular-shaped metallic washer having a plurality of inwardly inclined teeth provided with sharp edges disposed in juxtaposition with said annular-shaped washer, said teeth being projected against and bearing on said inwardly inclined surface, said seal gasket being deflected outwardly in a longitudinal direction upon the generation of a predetermined gas pressure, whereby said teeth of said annular-shaped washer slide and move relative to said inclined surface of said annular-shaped back-up washer, and whereby at least one of said teeth penetrate said thin vertical wall portion of said seal gasket thereby diminishing said cell pressure.

2. The sealed galvanic cell of claim 1 wherein said teeth of said annular-shaped washer are V-shaped.

3. The sealed galvanic cell of claim 1 wherein said seal gasket is of nylon.

4. In combination, a sealed galvanic cell having a centralized negative terminal, an inner cover provided with at least one aperture for venting gas, an outer cover, an outer jacket, insulating means between said inner and outer covers, electrical contact means between said centralized negative terminal and said outer cover, a positively polarized cupped metallic container subject to internal gas pressure and a safety seal comprising an annular-shaped seal gasket of plastic material sealing the open end of said cupped container between said centralized negative terminal and said inner cover of said cell and between said inner cover and said cupped container, said seal gasket having an inner flange which is of sufficient thickness to support said centralized negative terminal, an outer flange portion and a substantially thin, vertical wall portion surrounding said inner flange, a yieldable annular-shaped metallic back-up washer having an inwardly inclined surface disposed below and in juxtaposition with said seal gasket leaving exposed said substantially thin, vertical wall portion of said seal gasket, a bowed annular-shaped metallic washer having a plurality of inwardly inclined teeth provided with sharp edges disposed atop of said annular-shaped washer, said teeth being projected against and bearing on said inwardly inclined surface of said annular-shaped back-up washer, said seal gasket being deflected outwardly in a longitudinal direction upon the generation of a predetermined gas pressure, whereby said teeth of said annular-shaped washer slide and move relative to said inclined surface of said annular-shaped back-up washer, and whereby at least one of said teeth punctures said substantially thin vertical wall portion of said seal gasket, thereby venting said cell pressure via said puncture in said seal gasket to said aperture in said inner cover, and said outer cover being secured to said outer jacket whereby said safety seal is concealed from view.

5. The combination of claim 4 wherein said teeth of said annular-shaped washer are V-shaped.

6. The combination of claim 4 wherein said seal gasket is of nylon.

References Cited by the Examiner

UNITED STATES PATENTS 2,693,499  11/1954  Newmann _____ 136—177
3,219,488  11/1965  Southworth _____ 136—177 X WINSTON A. DOUGLAS, *Primary Examiner.*

D. L. WALTON, *Assistant Examiner.*